United States Patent
[11] 3,619,161

[72] Inventors Warren A. Knarr;
 Tommie G. Edwards, both of Ponca City, Okla.
[21] Appl. No. 772,377
[22] Filed Oct. 31, 1968
[45] Patented Nov. 9, 1971
[73] Assignee Continental Oil Company
 Ponca City, Okla.

[54] PURIFICATION OF AMMONIATED SUPERPHOSPHORIC ACID FERTILIZER SOLUTIONS
 1 Claim, No Drawings
[52] U.S. Cl. .................................................. 71/34, 23/107, 210/44
[51] Int. Cl. ...................................................... C05b 1/06
[50] Field of Search ............................................ 210/21, 44; 23/165 B; 71/34

[56] References Cited
UNITED STATES PATENTS

| | | | |
|---|---|---|---|
| 2,334,703 | 11/1943 | Henkel............................ | 210/53 |
| 2,512,327 | 6/1950 | Hawes et al.................... | 260/639 |
| 2,559,496 | 7/1951 | Epps............................... | 210/21 |
| 2,761,563 | 9/1956 | Waterman et al. ........... | 210/21 |
| 2,988,504 | 6/1961 | Mazurek ........................ | 23/165 B X |
| 3,109,728 | 11/1963 | Smith et al..................... | 71/43 X |
| 3,276,995 | 10/1966 | McDonald..................... | 210/21 |

Primary Examiner—Samih N. Zaharna
Assistant Examiner—Bennett H. Levenson
Attorneys—Joseph C. Kotarski, Henry H. Huth, Jerry B. Peterson, William A. Mikesell, Jr. and Carroll Palmer ABSTRACT: Fertilizer solutions derived from wet process phosphoric acid, such as ammoniated superphosphoric acid, are clarified of carbonaceous impurities by admixing with a small amount of a water-immiscible organic stratifying agent comprising an organic liquid of lower specific gravity than the solution being treated, allowing settling, and then separating an upper carbonaceous layer of impurities.

PURIFICATION OF AMMONIATED SUPERPHOSPHORIC ACID FERTILIZER SOLUTIONS

This invention relates to a method for purifying liquid fertilizer solutions. In one aspect, the invention relates to removal of carbonaceous impurities from a fertilizer solution derived from wet process phosphoric acid. In another aspect, the invention relates to removal of carbonaceous impurities from fertilizer solution by a novel flotation process.

Fertilizer solutions which contain phosphoric acid produced by the so-called wet process, whereby phosphate rock is digested with sulfuric acid, are characterized by the presence of finely divided carbonaceous impurities. These impurities derive from the phosphate rock, and cause the product merchant phosphoric acid or fertilizer solution to have a dark or even black color. This carbonaceous matter not only gives the product an unattractive appearance, but also causes various problems of plugging equipment and depositing sludge. The carbonaceous matter can be avoided or greatly reduced by calcining the phosphate rock prior to its digestion, or by treating the merchant phosphoric acid by various means, such as adsorption on activated carbon or filtration through diatomaceous earth. These treatments are all rather expensive.

It is accordingly an object of this invention to provide a simple and inexpensive process for removing carbonaceous impurities from liquid fertilizer solutions containing wet process phosphoric acid.

Other aspects, objects and the several advantages of this invention will become apparent upon study of this disclosure and the appended claims.

According to the invention, it has been discovered that carbonaceous impurities can be removed from liquid fertilizer solutions containing wet process phosphoric acid by a process which comprises intimately mixing with the solution reagent characterized as being a water-immiscible organic liquid, allowing the mixture to settle, and separating a layer comprising carbonaceous impurities.

Fertilizer solutions which can be treated according to this invention include any aqueous solution containing wet process phosphoric acid. Although the process of the invention would probably be operable on solutions not containing wet process acid, such other materials normally do not present the problem of being contaminated by carbonaceous impurities. Examples of fertilizer solutions which can be treated are wet process merchant acid itself (merchant acid being a term of art indicating phosphoric acid of about 50 to 55 weight percent $P_2O_5$), fertilizer base solutions such as 10–34–0 and 11–36–0, and mixed solutions containing also a potassium salt, such as 7–7–7. Base solutions such as 10–34–0 are usually produced by one of two routes, the first comprising concentrating merchant acid to super phosphoric acid of about 69 percent or more $P_2O_5$ and subsequently reacting the acid with ammonia, and the second comprising reacting anhydrous ammonia with merchant acid and allowing the heat of reaction to vaporize a portion of the water. The present invention is useful in clarifying both types of base solution, although it has surprisingly been discovered that base solutions produced via the super acid route should not be agitated during the settling period, while base solutions produced by the second or so-called 'direct' route can be agitated during the settling period if desired. Although we do not wish to be so bound, we believe that this difference in behavior of the carbonaceous solids derives from the difference in history, possibly even more specifically the surface characteristics, of the carbon. The method of this invention is not useful for a slurry fertilizer, i.e. a fertilizer containing appreciable solids other than the carbonaceous matter.

The reagent used for clarifying according to the invention can be broadly described as a stratifying agent comprising an organic of lower specific gravity than the solution being treated, and substantially immiscible with water. By 'water immiscible' or 'substantially immiscible with water' we mean that, at separation temperature, a separate liquid reagent phase can be formed. Suitable reagents include pale oil, naphtha, alcohols of about six to 18 carbons, and surfactants such as alkyl benzene sulfonates, tall oils, tall oil fatty acids, and ethoxylated fatty alcohols and acids. By pale oil we mean a primarily paraffinic mineral oil containing up to about 6 weight percent aromatics and having a viscosity at 100° F. of about 65–700 S.S.U. By naphtha is meant a paraffinic petroleum distillate having a boiling range between about 100° and about 215° F. Suitable alcohols include n-hexanol, i-octanol, and n-decanol. Suitable alkyl benzene sulfonates are those having average molecular weights between about 400 and about 700, preferably about 450. The tall oils most useful are those containing at least about 70 percent acid. Both the tall oil and the tall oil fatty acid preferably exhibit a low "unsaponifiable" content, e.g. less than about 10 percent, primarily because of their superior handling and storage characteristics. Suitable ethoxylated fatty alcohols and acids are those of a sufficiently large alkyl group and a low enough ethoxylate content to be substantially immiscible with water. Alkyl groups will typically range from about six to 14 carbons, with the ethoxylate content ranging up to as much as about 80 percent for the lower alkyl members. In order to demonstrate that the method of subject invention is not the result of surfactant properties of the flotation reagent, several different types of water-soluble surfactants were tested, and resulted in very slight to no effect in removing carbonaceous matter.

The conditions for admixing the treating reagent with the fertilizer solution are not especially critical. The main objective when carrying out the mixing step is to achieve intimate contact between the reagent and the carbonaceous matter; this is advantageously effected by agitating in a vessel. Only small amounts of the reagent are required, such as from about 0.1 to about 0.5 weight percent based on fertilizer solution, although it will be obvious that the amount of reagent required will be dependent on the amount of impurity present and can thus vary outside this range, from as little as about 0.01 weight percent to as much as 1 weight percent or more. The rate of clarification, i.e. the time required to obtain a clear phase split, is accelerated by elevated temperatures of up to about 120° F.; little increase in rate is noted at 120° F. as compared to the rate at 100° F., although a substantial increase is noted at 100° F. as compared with the rate at 75° F. Operation at ambient temperature is quite satisfactory, requiring only a somewhat greater settling time. Some phase split by gravity is noted in a matter of hours, although optimum separation is achieved with 1–3 days quiescent settling. Additional settling beyond about 3 days, e.g. to 5 days or more, seems to result in a diminishing improvement in clarification. When the settling and separation is effected under super-gravitational force, i.e. in a centrifuge, these steps can be carried out immediately after the contacting or admixing step. It is also to be noted that this invention does not comprise a froth flotation, in which particles are lifted by attachment of air bubbles thereto. It has surprisingly been discovered, as noted, that the prior treatment of the solution affects the manner in which flotation can best be achieved. A fertilizer base solution, such as ammoniated superphosphoric acid, which is derived by concentrating wet process merchant phosphoric acid to super acid strength, and then reacting with ammonia, should not be agitated after initially admixing the treating reagent; agitation during the settling period greatly diminishes the settling rate, so that quiescent settling is best for such solutions. On the other hand, fertilizer base solutions made by directly reacting wet process merchant phosphoric acid ammonia can be agitated, as by bubbling air therethrough, during the initial portion of the settling period. For such solutions, little difference is noted in settling rate with or without initial air agitation.

After the desired amount of phase split by stratification has been achieved in the settling period, the solution will exhibit an upper layer highly concentrated in carbonaceous impurities and, below this, a clarified solution. In some instances there will also be a small amount of solids in the very bottom of the vessel, which appears to comprise crystalline mono- and di-ammonium phosphates and/or other fertilizer solids. The product clarified layer can be separated by e.g. filtration or centrifugation, but is best recovered by a simple decantation.

The clarified product is useful in all the usual manners and, although in certain instances it exhibits a slightly dark color, it is clear and virtually free of carbonaceous impurities. The clarified products have been treated with several commercial flocculating agents in order to test the efficacy of the invention, and no improvement was achieved by the flocculation. Treated solutions exhibit no corrosivity problem toward mild steel, and fertilizer base solutions clarified by the method of this invention have also been agromonically tested for phytotoxicity. No difference in phytotoxicity was noted between untreated fertilizer base solution, base solution treated according to the invention, and the floated sludge layer resulting from treatment according to the invention. Although some of the treating reagents are phytotoxic upon direct application at high rates, e.g. 40 gal. per acre, only about 4–16 ounces of such reagent are associated with 100 lb. of the solution, which can typically treat an acre. The sludge layer, being also nonphytotoxic at normal application rates, can be blended in slurry or solid fertilizers, as it exhibits essentially the same nutrient value as does the treated solution.

The invention will now be further illustrated by reference to the following specific examples.

EXAMPLE 1

Several 100 g. samples of 10–34–0 fertilizer base solution, which was derived my mixing wet process super phosphoric acid, ammonia, and water, were treated by mixing with the desired amount of treating reagent for 30 seconds at low speed in a Waring blender. The materials were then allowed to settle overnight in graduated cylinders. The split was then qualitatively rated as:

0 = no phase split
1 = split with clarified layer very dark
2 = split with clarified layer medium
3 = split with clarified layer light
4 = split with no apparent carbon in clarified layer

| Treating reagent | Conc., % | Rating | Character of treating reagent |
|---|---|---|---|
| n-hexanol ethoxylated to 80 | 0.5 | 2 | water soluble |
| n-tetradecanol ethoxylated to 60 | 0.5 | 2 | water soluble |
| n-decanol n-dodecanol mixture ethoxylated to 60 | 0.5 | 1 | water soluble |
| Sodium salt of sec. alkyl (C$_{12}$1-13) benzenes | 0.5 | 0 | water soluble |
| Dodecylbenzyl trimethyl ammonium chloride | 0.5 | 2 | water soluble |
| Ammonium salt of sulfated straight chain alcohol (C$_{10}$-C$_{14}$) ethoxylated to 40% | 0.5 | | water soluble |
| n-hexanol | 0.1 | 3 | oil soluble |
| n-hexanol | 0.25 | 3 | oil soluble |
| n-hexanol | 0.5 | 3 | oil soluble |
| n-decanol | 0.5 | 3 | oil soluble |
| n-tetradecanol | 0.5 | 3 | oil soluble |
| n-octadecanol | 0.5 | 3 | oil soluble |
| n-tetradecanol ethoxylated to 20% | 0.5 | 3 | oil soluble |
| none (control) | | 0 | |

EXAMPLE 2

Tests were run on a number of treating reagents in manner of example 1, except that the amount of clarified s tion was measured. All reagents were oil soluble.

| Treating reagent | Concentration, wt. percent | Days of settling | Perce sol cla |
|---|---|---|---|
| None (control) | | 6 | |
| Pale oil | 0.10 | 14 | |
| Do | 0.25 | 14 | |
| Do | 1.0 | 8 | |
| Do | 4.0 | 8 | |
| Do | 20 | 8 | |
| Do | 50 | 8 | |
| Naphtha | 1.0 | 7 | |
| Do | 4.0 | 7 | |
| Do | 20 | 7 | |
| Do | 50 | 7 | |
| n-Hexanol | 0.10 | 6 | |
| Do | 0.25 | 6 | |
| Alkyl benzene sulfonate, ave. M.W. ca. 450 | 0.25 | 15 | |
| Do | 0.50 | 15 | |
| Do | 1.0 | 15 | |
| Do | 4.0 | 8 | |
| Do | 20 | 8 | |
| Tall oil (28% rosin acid) | 0.10 | 8 | |
| Do | 0.25 | 8 | |
| Do | 0.50 | 8 | |
| Do | 0.25 | 5 | |
| Tall oil (38% rosin acid) | 0.10 | 7 | |
| Do | 0.25 | 7 | |
| Do | 0.50 | 7 | |
| Tall oil fatty acid | 0.10 | 8 | |
| Do | 0.25 | 8 | |
| Do | 0.50 | 8 | |
| n-Dodecanol n-tetradecanol mixture ethoxylated to 40% | 0.10 | 6 | |
| Do | 0.25 | 6 | |

It can be seen from this example that excessive amount treating reagent can actually be detrimental, as can exces settling time.

Having thus described the invention by providing spe examples thereof, it is to be understood that no undue lin tions or restrictions are to be drawn by reason thereof and many variations and modifications are within the scope of invention.

What is claimed is:

1. The method of removing carbonaceous impurities fro fertilizer base solution free from appreciable solids con other than carbonaceous impurities derived by reacting process super phosphoric acid with ammonia which c prises:

initially admixing with said solution, and without sequent agitation, immiscible liquid organic stratif agent, in an amount of at least about 0.1 percent weight of fertilizer solution and dependent on the am of impurity present, said agent being selected from group consisting of alkyl benzene sulfonates, tall oil, taining at least about 70 percent acid alcohol ethoxyl and ethoxylated fatty acids, and having a specific gra less than that of said solution in amount effective to c flotation of said impurities;

b. permitting the thus-admixed solution to quiescently s for at least about 1 day, and sufficient to attain optin separation c. subsequently separating said solution into two fracti an upper layer comprising said impurities and a lc layer comprising clarified solution of the ammoniated perphosphoric acid.

PO-1050
(5/69)

UNITED STATES PATENT OFFICE
CERTIFICATE OF CORRECTION

Patent No. 3,619,161      Dated November 9, 1971

Inventor(s) Warren A. Knarr and Tommie G. Edwards

It is certified that error appears in the above-identified patent and that said Letters Patent are hereby corrected as shown below:

In the Abstract: Line 2, "superphosphoric" should be -- superphosphoric --.
Column 1, line 34, after "solution" insert -- a --.
Column 2, line 65, insert "with" before ammonia.

Column 3, in the Table following Example 1: See insertions and corrections as marked in red on copy of table fastened below.

| Treating reagent | Conc., % | Rating | Character of treating reagent |
|---|---|---|---|
| n-hexanol ethoxylated to 80 % | 0.5 | 2 | water soluble |
| n-tetradecanol ethoxylated to 60 % | 0.5 | 2 | water soluble |
| n-decanol n-dodecanol mixture ethoxylated to 60 % | 0.5 | 1 | water soluble |
| Sodium salt of sec alkyl ($C_{12}$ – $C_{13}$) benzenes | 0.5 | 0 | water soluble |
| Dodecylbenzyl trimethyl ammonium chloride | 0.5 | 2 | water soluble |
| Ammonium salt of sulfated straight chain alcohol ($C_{10}$–$C_{14}$) ethoxylated to 40% | 0.5 | 0 | water soluble |
| n-hexanol | 0.1 | 3 | oil soluble |
| n-hexanol | 0.25 | 3 | oil soluble |
| n-hexanol | 0.5 | 3 | oil soluble |
| n-decanol | 0.5 | 3 | oil soluble |
| n-tetradecanol | 0.5 | 3 | oil soluble |
| n-octadecanol | 0.5 | 3 | oil soluble |
| n-tetradecanol ethoxylated to 20% | 0.5 | 3 | oil soluble |
| none (control) | — | 0 | — |

PO-1050
(5/69)

UNITED STATES PATENT OFFICE
CERTIFICATE OF CORRECTION

Patent No. 3,619,161                Dated November 9, 1971

Inventor(s) Warren A. Knarr and Tommie G. Edwards

It is certified that error appears in the above-identified patent and that said Letters Patent are hereby corrected as shown below:

Column 4, in the table following Example 2, a portion of the wording has been omitted on the printed copies received and all of the information under that heading is missing. The column heading and information thereunder should read:

% of
solution
clarified 67 in middle
82.1
85.7
83.4
81.1
64.1
38.8
84.9
81.1
70.0
31.3
83
83
85.3
86.0
86.0
78.4
71.4
82.4
82.9
82.4
87.2
85.1
87.2
84.3
85.3
82.9
83.1
79
81.5

PO-1050
(5/69)

UNITED STATES PATENT OFFICE
CERTIFICATE OF CORRECTION

Patent No. 3,619,161    Dated November 9, 1971

Inventor(s) Warren A. Knarr and Tommie G. Edwards

It is certified that error appears in the above-identified patent and that said Letters Patent are hereby corrected as shown below:

Column 4, beginning at line 45 and continuing through line 74, endings of all words closing each line have been lost from the printed copies we received.

Column 4, line 65, following the word "acid" the following words should be inserted -- , tall oil fatty acid, said tall oil or tall oil acid having an unsaponifiable content less than about 10%, --.

Signed and Sealed this sixteenth Day of March 1976

[SEAL]

Attest:

RUTH C. MASON
Attesting Officer

C. MARSHALL DANN
Commissioner of Patents and Trademarks